No. 732,873. PATENTED JULY 7, 1903.
A. LUENBERGER.
COVER OR PROTECTOR FOR PLOWS.
APPLICATION FILED AUG. 29, 1902.
NO MODEL.
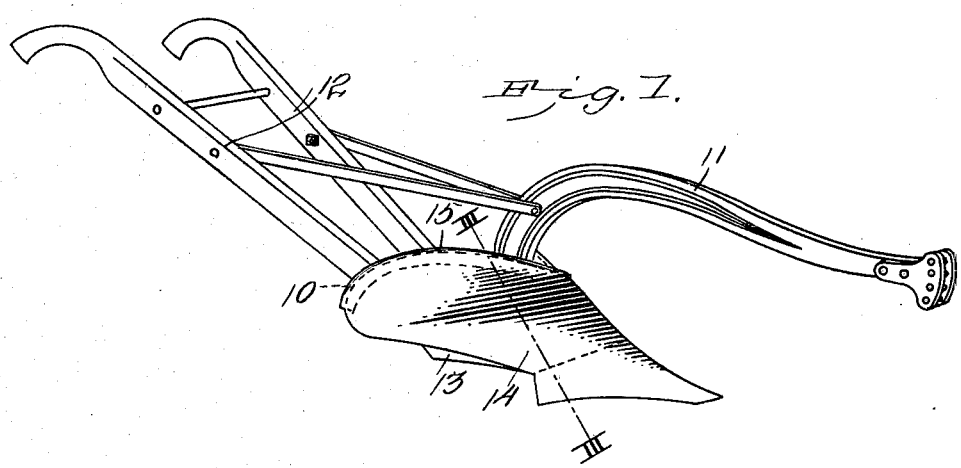
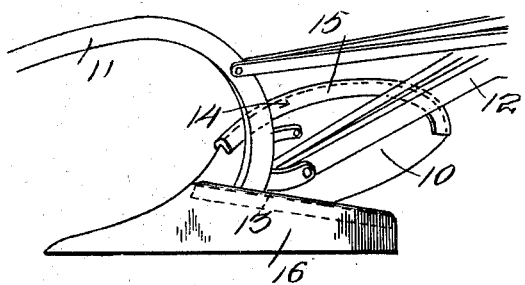
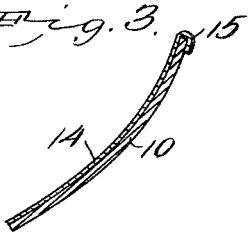
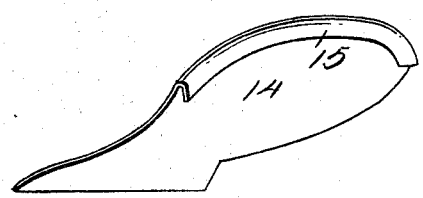
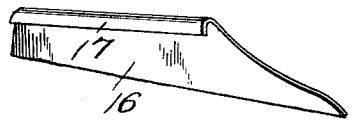

No. 732,873.

Patented July 7, 1903.

UNITED STATES PATENT OFFICE.

ABNER LUENBERGER, OF ALBURNETT, IOWA.

COVER OR PROTECTOR FOR PLOWS.

SPECIFICATION forming part of Letters Patent No. 732,873, dated July 7, 1903.

Application filed August 29, 1902. Serial No. 121,506. (No model.)

*To all whom it may concern:*

Be it known that I, ABNER LUENBERGER, a citizen of the United States, residing at Alburnett, in the county of Linn and State of Iowa, have invented a new and useful Cover or Protector for Plows, of which the following is a specification.

This invention relates to plows, cultivators, and similar implements, and has for its object the production of a device adapted to protect the moldboards when not in use; and the invention consists in a detachable shield or cover preferably conforming to the moldboard and adapted to be detachably connected therewith when the plow or cultivator is not in use to shield the moldboard from the action of the elements and prevent oxidation.

Other novel features of the invention will appear in the annexed description and be specified in the claims following.

For the purpose of illustration the invention is shown applied to an ordinary plow; but it will be understood that I do not wish to be limited to any specific construction of plow or other implement to which the device may be applied and reserve the right to use the same to cover any working face of any plow to which it is capable of being applied.

In the drawings employed for the purpose of illustration, Figure 1 is a perspective view of an ordinary plow with the improvement applied. Fig. 2 is a perspective view of the same from the landside. Fig. 3 is a sectional view, enlarged, through the moldboard on the line III III of Fig. 1. Fig. 4 is a reversed perspective view of the moldboard-shield detached. Fig. 5 is a reversed perspective view of the landside-shield detached.

The moldboard is represented at 10, the beam at 11, the handles at 12, and the landside at 13, of the usual construction.

The shield which is the subject of the present application consists of a single plate, preferably of sheet metal, conforming in outline to the moldboard and curved to closely engage it, or, in other words, forming a duplicate substantially of the moldboard.

The shield 14 will be turned over at the upper edge 15 to embrace the edges of the moldboard and enable the shield to be suspended therefrom, as illustrated in Fig. 3. This shield is made to conform to the contour of the moldboards or other working faces of the various implements to which they are applied, as will be understood. When employed upon cultivator-moldboards and similar implements having no "landsides," the shields 14 will be all that will be required; but when employed upon plows and similar implements wherein the landsides 13 are employed the latter will be provided with a separate shield 16, constructed in substantially the same manner as the shield 14 and shaped to conform to the landside and provided with a bent-over edge 17 to enable it to be suspended from the landside. If desired, the shield for the landside may be connected to the adjacent edge of the shield 14 and may be made to cover the landside in whole or in part, as may be required. By this simple expedient the working faces of the plow may be covered and protected from rain, snow, and dampness from other sources and rusting or oxidation prevented and will be found very useful and efficient for that purpose.

The shields may be constructed of any suitable material, but will preferably be of light sheet metal, such as tinned iron or steel, galvanized iron, or other metal.

As the plows and other implements will not generally be shaken about or roughly handled when not in use, the shields will not generally require any supporting means other than the turned-over edges; but other fastening means may be employed, if required.

Having thus described the invention, what is claimed is—

1. As a new article of manufacture, a protector for the working face of a plow member, the same consisting of a shield conforming to the face of the plow member, and having a flange for detachably engaging the edge of the member.

2. As a new article of manufacture, a protector for the moldboard of plows and the like, consisting of a shield conforming to the working face of the moldboard, one edge of said shield being angularly bent to engage the edge of the moldboard and support the shield in position.

In testimony that I claim the foregoing as my own I have hereto affixed my signature in the presence of two witnesses.

ABNER LUENBERGER.

Witnesses:
W. S. MACLAFFERTY,
H. E. WYCKOFF.